(12) United States Patent
Levi et al.

(10) Patent No.: US 7,466,721 B2
(45) Date of Patent: *Dec. 16, 2008

(54) ACTIVE STREAM FORMAT FOR HOLDING MULTIPLE MEDIA STREAMS

(75) Inventors: Steven P. Levi, Redmond, WA (US); Mark D. VanAntwerp, Seattle, WA (US); Craig M. Dowell, Redmond, WA (US); Chadd B. Knowlton, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 826 days.

This patent is subject to a terminal disclaimer.

(21) Appl. No.: 10/975,287

(22) Filed: Oct. 28, 2004

(65) Prior Publication Data

US 2005/0058133 A1   Mar. 17, 2005

Related U.S. Application Data

(60) Continuation of application No. 10/376,428, filed on Feb. 28, 2003, now Pat. No. 7,296,063, which is a division of application No. 09/510,565, filed on Feb. 22, 2000, now Pat. No. 6,836,791, which is a division of application No. 08/813,151, filed on Mar. 7, 1997, now Pat. No. 6,041,345.

(60) Provisional application No. 60/028,789, filed on Oct. 21, 1996, provisional application No. 60/013,029, filed on Mar. 8, 1996.

(51) Int. Cl.
*H04L 12/56* (2006.01)

(52) U.S. Cl. ..................... 370/474; 370/476; 709/218; 709/231

(58) Field of Classification Search ............... 370/537, 370/474, 476, 389, 465, 468; 709/217, 218, 709/234, 231
See application file for complete search history.

(56) References Cited

U.S. PATENT DOCUMENTS 4,819,226 A * 4/1989 Beckner et al. ............. 370/458
4,893,306 A * 1/1990 Chao et al. .................. 370/458

(Continued)

OTHER PUBLICATIONS

Review of: Intelligent Multimedia Interfaces, Mark T. Maybury-Wittenburg (1993) asl.ldc.upenn.edu/j/j94/j94-3015.pdf.

(Continued)

*Primary Examiner*—Min Jung
(74) *Attorney, Agent, or Firm*—Lee & Hayes, PLLC

(57) ABSTRACT

An active stream format is defined and adopted for a logical structure that encapsulates multiple data streams. The data streams may be of different media. The data of the data streams is partitioned into packets that are suitable for transmission over a transport medium. The packets may include error correcting information. The packets may also include clock licenses for dictating the advancement of a clock when the data streams are rendered. The format of ASF facilitates flexibility and choice of packet size and in specifying maximum bit rate at which data may be rendered. Error concealment strategies may be employed in the packetization of data to distribute portions of samples to multiple packets. Property information may be replicated and stored in separate packets to enhance its error tolerance. The format facilitates dynamic definition of media types and the packetization of data in such dynamically defined data types within the format.

26 Claims, 24 Drawing Sheets

U.S. PATENT DOCUMENTS

| | | |
|---|---|---|
| 4,914,527 A | 4/1990 | Asai et al. |
| 5,053,946 A | 10/1991 | Jain |
| 5,086,402 A | 2/1992 | Sterling, II |
| 5,278,848 A | 1/1994 | Yamaguchi |
| 5,296,643 A | 3/1994 | Kuo et al. |
| 5,361,334 A | 11/1994 | Cawley |
| 5,388,264 A | 2/1995 | Tobias, II et al. |
| 5,450,248 A | 9/1995 | Van Eijck et al. |
| 5,452,297 A | 9/1995 | Hiller et al. |
| 5,454,297 A | 10/1995 | Phillips |
| 5,491,685 A | 2/1996 | Klein et al. |
| 5,506,844 A | 4/1996 | Rao |
| 5,519,780 A | 5/1996 | Woo et al. |
| 5,566,330 A | 10/1996 | Sheffield |
| 5,588,009 A | 12/1996 | Will |
| 5,610,653 A | 3/1997 | Abecassis |
| 5,633,880 A | 5/1997 | Lokhoff |
| 5,689,518 A | 11/1997 | Galand et al. |
| 5,701,300 A | 12/1997 | Jeon et al. |
| 5,715,176 A | 2/1998 | Mobini |
| 5,719,786 A | 2/1998 | Nelson et al. |
| 5,729,471 A | 3/1998 | Jain et al. |
| 5,734,589 A | 3/1998 | Kostreski et al. |
| 5,740,463 A | 4/1998 | Oshima et al. |
| 5,754,782 A | 5/1998 | Masada |
| 5,781,534 A | 7/1998 | Perlman et al. |
| 5,815,707 A | 9/1998 | Krause et al. |
| 5,832,219 A | 11/1998 | Pettus |
| 5,872,923 A | 2/1999 | Schwartz et al. |
| 5,933,603 A | 8/1999 | Vahalia et al. |
| 5,956,454 A | 9/1999 | Shinohara et al. |
| 6,044,396 A | 3/2000 | Adams |
| 6,052,507 A | 4/2000 | Niida et al. |
| 6,424,714 B1 * | 7/2002 | Wasilewski et al. ......... 380/200 |
| 7,206,822 B2 * | 4/2007 | Levi et al. ................... 709/217 |
| 7,342,924 B2 * | 3/2008 | Levi et al. ................... 370/389 |

OTHER PUBLICATIONS

Techniques for Multimedia Synchronization in Network,-Rangan, Ramanathan, (1993) ftp.cs.ucsd.edu/pub/multimedia/compComm.ps.Z.

NetMedia: A client-Server Distributed Multimedia Database -Gullapudi, Zhang (1996) www.cs.buffalo.edu/-golla-s/papers/mmw.ps.Z.

Bennett, et al., "Evolution of a 60 Decibel Op Amp Using Genetic Programming", available at <<www.genetic-programming.com/ICES60dB.ps>>, 1996, 16 pages.

Citrin, et al., "The Design of a Completely Visual Object-Oriented Programming Language", to appear in Visual Object-Oriented Programming: Concepts and Environments, 1994, pp. 1-26.

Spector, "Evolving Control Structures with Automatically Defined Macros", Working Notes of the AAAI Fall Symposium on Genetic Programming, the American Association for Artificial Intelligence, 1995, pp. 99-105.

* cited by examiner

ACTIVE STREAM FORMAT FOR HOLDING MULTIPLE MEDIA STREAMS

RELATED APPLICATIONS

The present application claim priority under 35 U.S.C. §120 as a continuation of U.S. patent application Ser. No. 10/376,428, filed Feb. 28, 2003, which is a divisional of U.S. patent application Ser. No. 09/510,565, filed on Feb. 22, 2000, which is a divisional of U.S. patent application Ser. No. 08/813,151, filed on Mar. 7, 1997, now U.S. Pat. No. 6,041,345, which claims priority from Provisional Application Ser. No. 60/013,029, filed on Mar. 8, 1996, and which claims priority from Provisional Application Ser. No. 60/028,789, filed on Oct. 21, 1996, all of which are incorporated herein in their entireties by reference.

TECHNICAL FIELD

The present invention relates generally to data processing systems and more particularly to an active stream format for holding multiple media streams.

BACKGROUND OF THE INVENTION

Conventional file and/or stream formats for transmitting multiple data streams of varying media are limited in several respects. First, these formats are generally limited in the packet sizes that are available for encapsulating data. Such formats, if they specify packets, specify the packets as a given fixed size. Another limitation of such formats is that they do not facilitate the use of error correction codes. A further weakness of these conventional formats is that they do not provide flexibility in timing models for rendering the data encapsulated within the format. An additional limitation with such formats is that they are not well adapted for different transport mediums that have different levels of reliability and different transmission capabilities.

SUMMARY OF THE INVENTION

In accordance with a first aspect of the present invention, a computer system has a logical structure for encapsulating multiple streams of data that are partitioned into packets for holding samples of data from the multiple data streams. A method of incorporating error correction into the logical structure is performed on the computer system. In accordance with this method, a portion of at least one packet is designated for holding error correcting data. The error correcting data is then stored in the designated portion of the packet.

In accordance with another aspect of the present invention, multiple streams of data are stored in packets and error correcting data is stored in at least some of the packets. The packets are encapsulated into a larger stream and information regarding what error correcting methods are employed for the packets is also stored in the packets.

In accordance with yet another aspect of the present invention, samples of data from multiple data streams are stored in packets, and replicas of information are stored in at least some of the packets. A flag is set in each of the packets that holds replicas to indicate that the packets hold the replicas. The packets are encapsulated into a larger logical structure and transmitted to a destination.

In accordance with a further aspect of the present invention, a logical structure is provided for encapsulating multiple streams of data where the streams of data are stored in packets. Clock licenses that dictate advancement of a clock are stored in multiple ones of the packets. The logical structure is transmitted from a source computer to a destination computer. The clock is advanced at the destination computer as dictated by the clock license for each packet that holds a clock license in response to the receipt or processing of the packet at the destination computer.

In accordance with an additional aspect of the present invention, a stream format is provided for encapsulating multiple streams of data. The stream format includes a field for specifying a packet size for holding samples of the multiple streams of data. In a logical structure that adopts the stream format, a value is stored in the field that corresponds to the desired packet size. Packets of the desired size are stored within the logical structure and the logical structure is transmitted over a transport medium to the destination.

In accordance with a further aspect of the present invention, a stream format is provided for encapsulating multiple streams of data. A field is included in a logical structure that adopts the stream format for holding a value that specifies a maximum bit rate at which the multiple streams may be rendered at the destination. A value is stored in the field and the logical structure is transmitted over a transport medium to a destination.

In accordance with another aspect of the present invention, a stream format is provided for encapsulating multiple data streams and a new media type is dynamically defined. An identifier of the media type is stored in a logical structure that adopts the stream format and packets of the new media type are stored in the logical structure.

DETAILED DESCRIPTION OF THE INVENTION

The preferred embodiment of the present invention employs an active stream format (ASF) for holding multiple media streams. ASF is well suited for storage of multimedia streams as well as transmission of multiple media streams over a transport medium. ASF is constructed to encapsulate diverse multimedia streams and facilitates optimal interleaving of respective media streams. ASF specifies the packetization of data and provides flexibility in choosing packet sizes. In addition, ASF enables the specification of a maximum data transmission rate. As such, the packetization and transmission of media streams may be tailored to facilitate the bandwidth limitations of the system on which media streams are stored or transmitted.

ASF facilitates the use of error correction and error concealment techniques on the media streams. In unreliable transport mediums, such error correction and error concealment is highly beneficial. ASF is independent of media types and is extensible to handle newly defined media types. ASF supports flexible timing approaches and allows an author of an ASF stream to specify the synchronization of events. ASF supports synchronized rendering using a variety of synchronization clock types and provides index information which can be used as markers for lookup to provide playback features such as fast forward and fast reverse.

Figure 1:
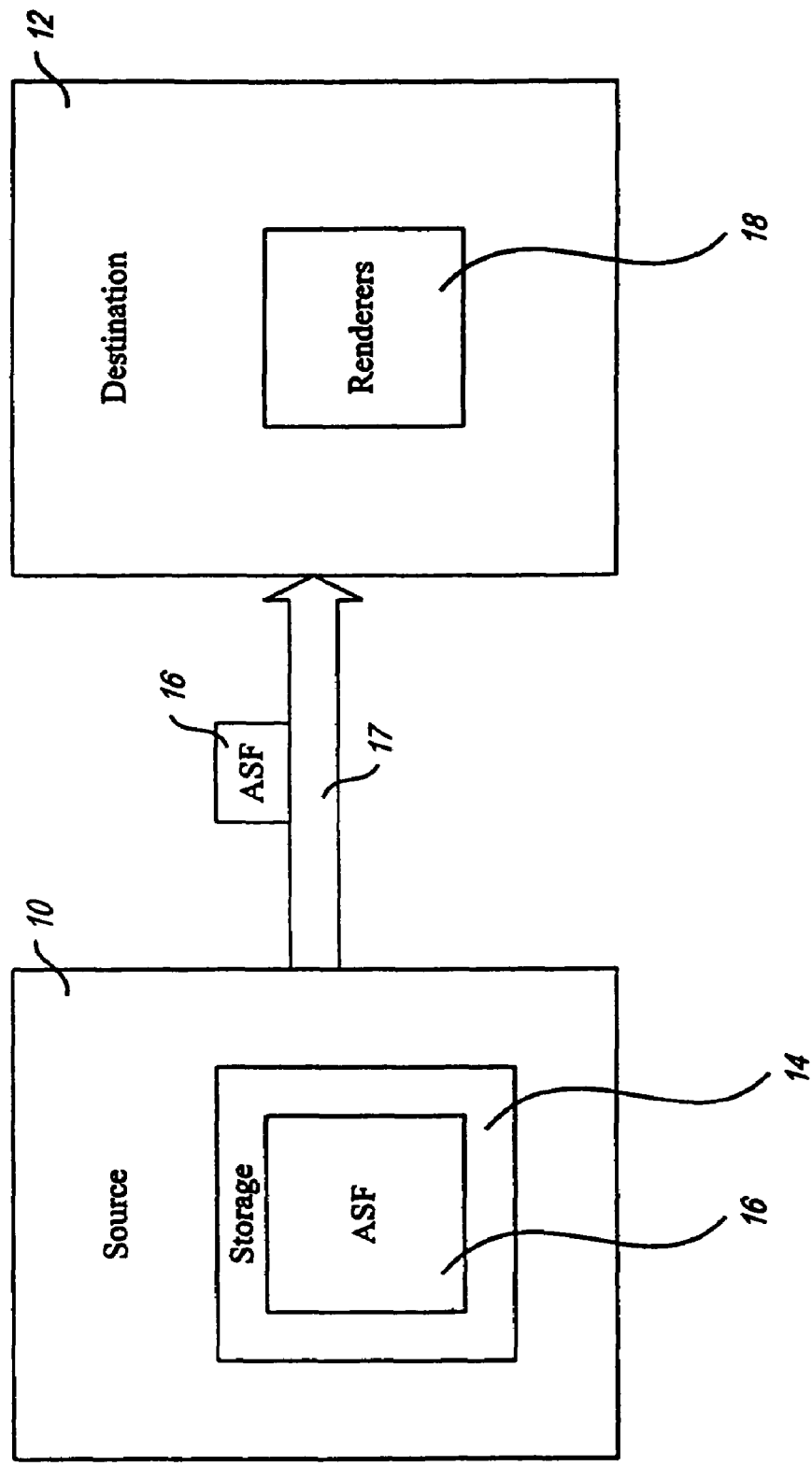
FIG. 1 is a block diagram illustrating a computer system that is suitable for practicing the preferred embodiment of the present invention.
Figure 2:
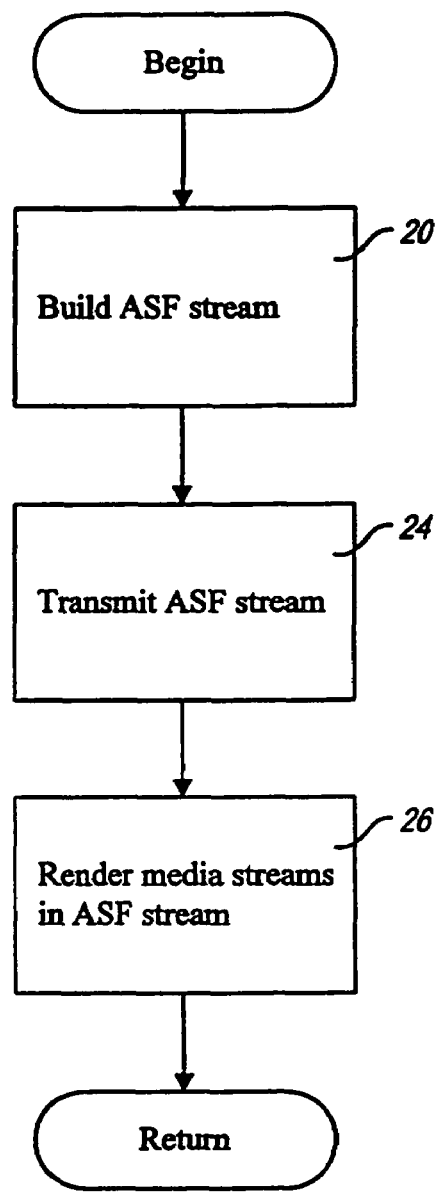
FIG. 2 is a flowchart illustrating use of the ASF stream in accordance with a preferred embodiment of the present invention.

FIG. 1 is a block diagram of an illustrative system for practicing the preferred embodiment of the present invention. FIG. 2 is a flowchart that illustrates the steps that are performed in the illustrative embodiment of FIG. 1. An ASF stream 16 is built by an author (step 20 in FIG. 2) and stored on a storage 14 on a source computer 10. As will be described in more detail below, ASF allows the author to design the stream for a most efficient storage based on the type of source computer 10 on which it is stored. Sometime later, the ASF stream 16 is transferred over a transport media 17, such as a network connection, to a destination computer 12 (step 24 in FIG. 2). The destination computer 12 includes a number of renderers 18 for rendering the media types that are present within the ASF stream 16. For example, the ASF stream 16 may include audio-type data and video-type data. The renderers 18 at the destination 12 include an audio renderer and a video renderer. The renderers may begin rendering data as soon as they receive data prior to the complete transmission of the entire ASF stream 16 (see step 26 in FIG. 2). The renderers need not immediately render the data, but rather may render the data at a later point in time.

Figure 3:
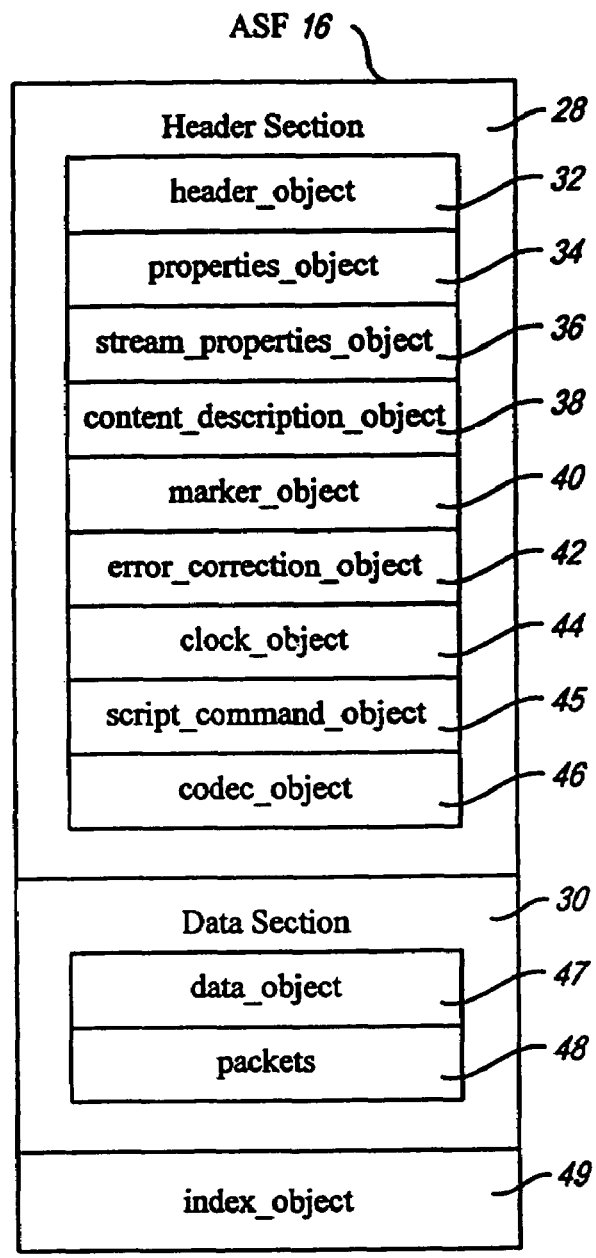
FIG. 3 is a block diagram illustrating the components of the ASF stream.
Figure 4:
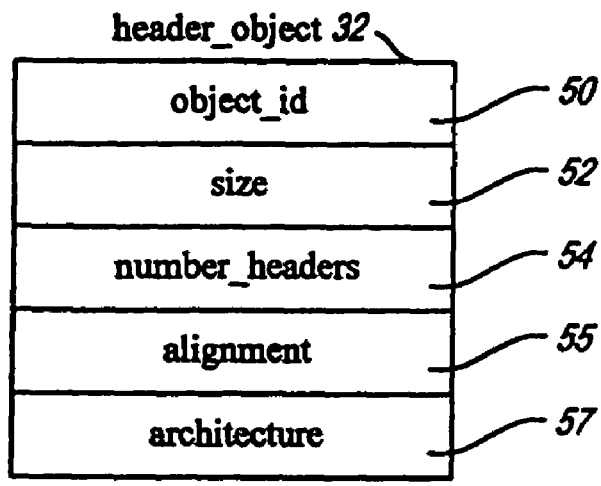
FIG. 4 is a block diagram illustrating the format of the header_object.

FIG. 3 depicts the basic logical organization of an ASF stream 16. It is up to the author to fill in the contents of the ASF stream in accordance with this format. The ASF stream 16 is divisible into a header section 28, a data section 30 and an index section 49. In general, the header section is first transmitted from the source computer 10 to the destination computer 12 so that the destination computer may process the information within the header section. Subsequently, the data section 30 is transmitted from the source computer 10 to the destination computer 12 on a packet-by-packet basis and the index section 49 is transmitted. The header section 28 includes a number of objects that describe the ASF stream 16 in aggregate. The header section 28 includes a header_object 32 that identifies the beginning of the ASF header section 28 and specifies the number of objects contained within the header section. FIG. 4 depicts the format of the header_object 32 in more detail. The header_object 32 includes an object_id field 50 that holds a UUID for the header_object. The UUID is an identifier. The header_object 32 also includes a size field 52 that specifies a 64-bit quantity that describes the size of the header section 28 in bytes. The header_object 32 additionally includes a number_headers field 54 that holds a 32-bit number that specifies a count of the objects contained within the header section that follow the header_object 32. An alignment field 55 specifies packing alignment of objects within the header (e.g., byte alignment or word alignment). The architecture field 57 identifies the computer architecture type of the data section 30 at the index section 49. The architecture field 57 specifies the architecture of these sections as little endian or big endian.

Figure 5:
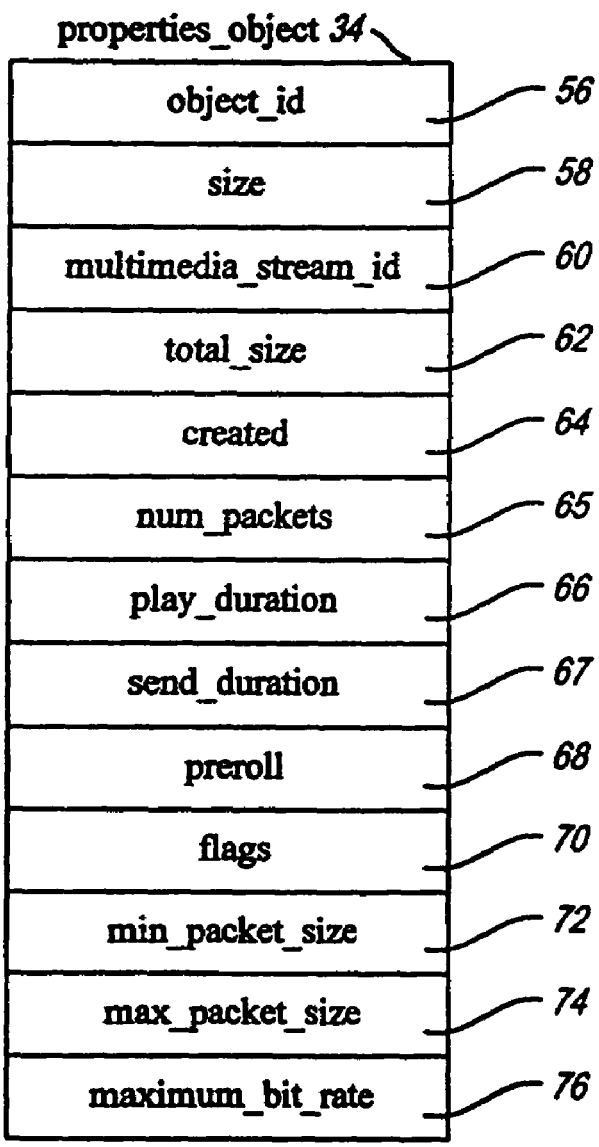
FIG. 5 is a block diagram illustrating the format of the properties_object.

The header_object 32 is followed in the header section 28 by a properties_object 34, such as depicted in FIG. 5. The properties_object 34 describes properties about the ASF stream 16. As can be seen in FIG. 5, the properties_object 34 includes an object_id field 56 that holds a UUID and a size field 58 that specifies the size of the properties_object 34. The properties_object 34 also includes a multimedia_stream_id field 60 that contains a UUID that identifies a multimedia ASF stream. A total_size field 62 is included in the properties_object 34 to hold a 64-bit value that expresses the size of the entire ASF multimedia stream.

The properties_object 34 also holds a created field 64 that holds a timestamp that specifies when the ASF stream was created. A num_packet field 65 holds a 64-bit value that defines the number of packets in the data section 30. A play_duration field 66 holds a 32-bit number that specifies the play duration of the entire ASF stream in 100-nanosecond units. For example, if the ASF stream 16 holds a movie, the duration field 66 may hold the duration of the movie. The play_duration field 66 is followed by a send_duration field 67 that corresponds to send the ASF stream in 100-nanosecond units. A preroll field 68 specifies the amount of time to buffer data before starting to play, and the flags field 70 holds 32-bits of bit flags.

The properties object 34 includes a min_packet_size field 72 and a max_packet_size field 74. These fields 72 and 74 specify the size of the smallest and largest packets 48 in the data section 30, respectively. These fields help to determine if the ASF stream 16 is playable from servers that are constrained by packet size. For constant bit rate streams, these values are set to have the same values. A maximum_bit_rate field 76 holds a value that specifies the maximum instantaneous bit rate (in bits per second) of the ASF stream.

Figure 6A:
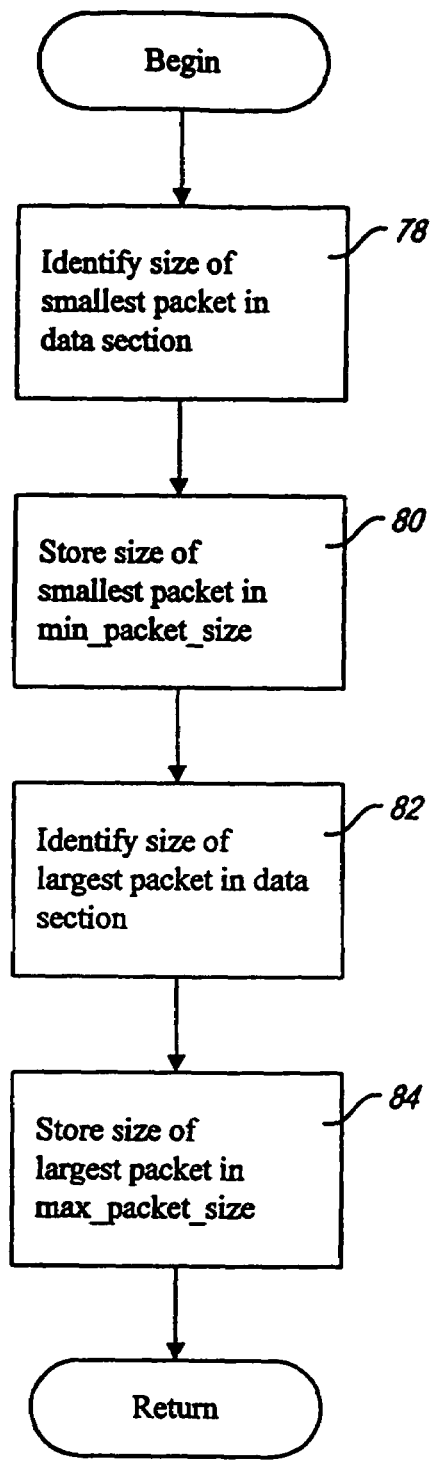
FIG. 6A is a flowchart illustrating the steps that are performed to fill in packet size fields within the ASF stream.

FIG. 6A is a flowchart illustrating how these values are identified and assigned during authoring of the ASF stream 16. First, the size of the smallest packet in the data section 30 is identified (step 78 in FIG. 6A). The size of the smallest packet is stored in the min_packet_size field 72 (step 80 in FIG. 6A). The size of the largest packet in the data section 30 is identified (step 82 in FIG. 6A), and the size is assigned to the max_packet_size field 74 (step 84 in FIG. 6A).

Figure 6B:
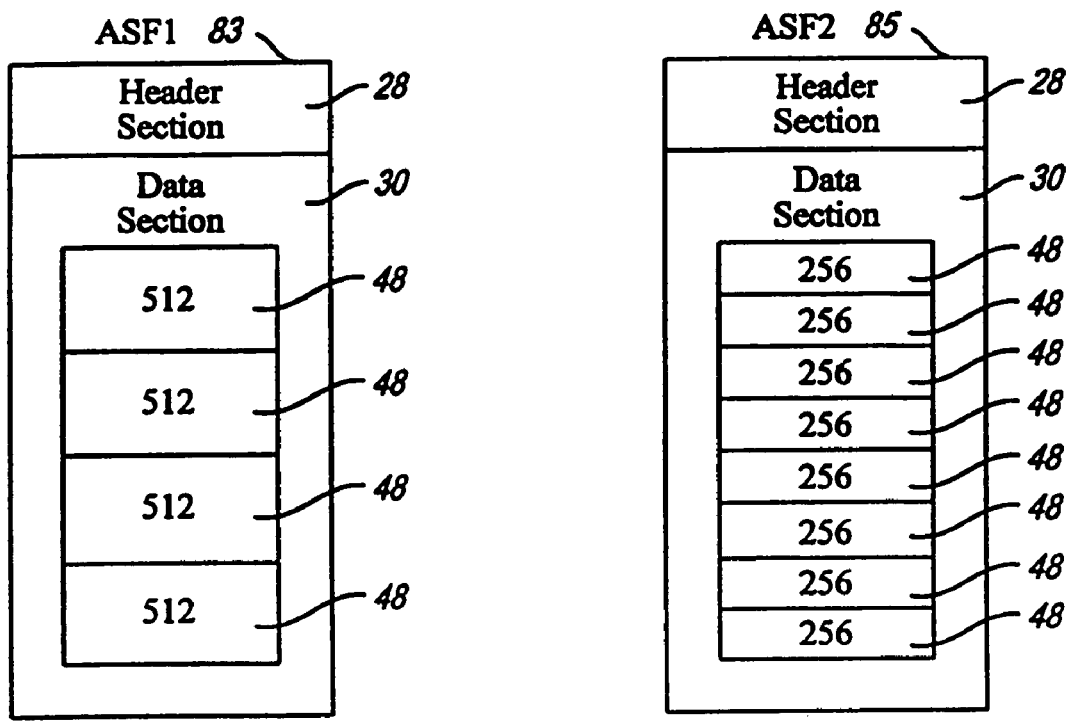
FIG. 6B is a diagram illustrating different packet sizes and respective ASF streams.

One of the beneficial features of ASF is its ability for facilitating different packet sizes for data of multiple media streams. FIG. 6B shows one example of two different streams 83 and 85. In stream 83, each of the packets is chosen to have a size of 512 bytes, whereas in stream 85 each of the packets 48 holds 256 bytes. The decision as to the size of the packets may be influenced by the speed of the transport mechanism over which the ASF stream is to be transmitted, the protocol adopted by the transport medium, and the reliability of the transport medium.

As mentioned above, the properties_object 34 holds a value in the maximum_bit_rate field 76 that specifies an instantaneous maximum bit rate in bits per second that is required to play the ASF stream 16. The inclusion of this field 76 helps to identify the requirements necessary to play the ASF stream 16.

Figure 7:
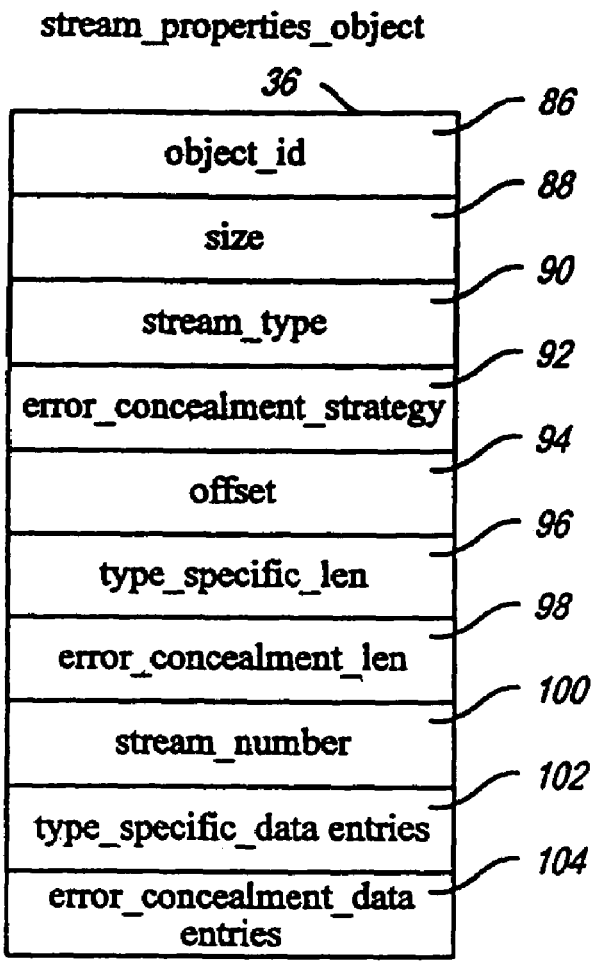
FIG. 7 is a block diagram illustrating the format of the stream_properties_object.

The header section 28 (FIG. 3) must also include at least one stream_properties_object 36. The stream_properties_object 36 is associated with a particular type of media stream that is encapsulated within the ASF stream 16. For example, one of the stream_properties_objects 36 in the header section 28 may be associated with an audio stream, while another such object is associated with a video stream. FIG. 7 depicts a format for such stream_properties_objects 36. Each stream_properties_object 36 includes an object_id field 86 for holding a UUID for the object and a size field 88 for holding a value that specifies the size of the object in bytes. A stream_type field 90 holds a value that identifies the media type of the associated stream.

Figure 8:
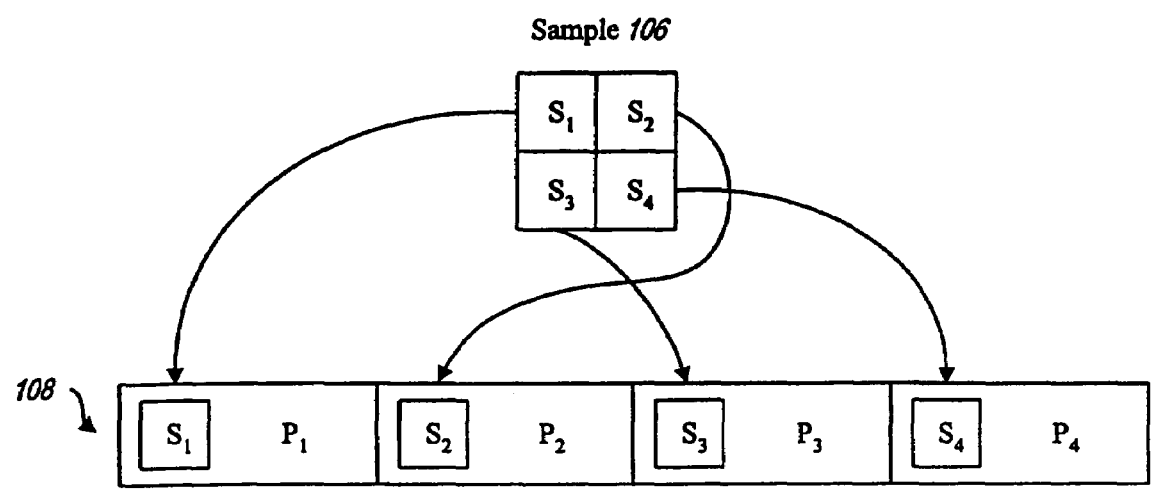
FIG. 8 is a diagram that illustrates the partitioning of a sample for storage in multiple packets.
Figure 9:
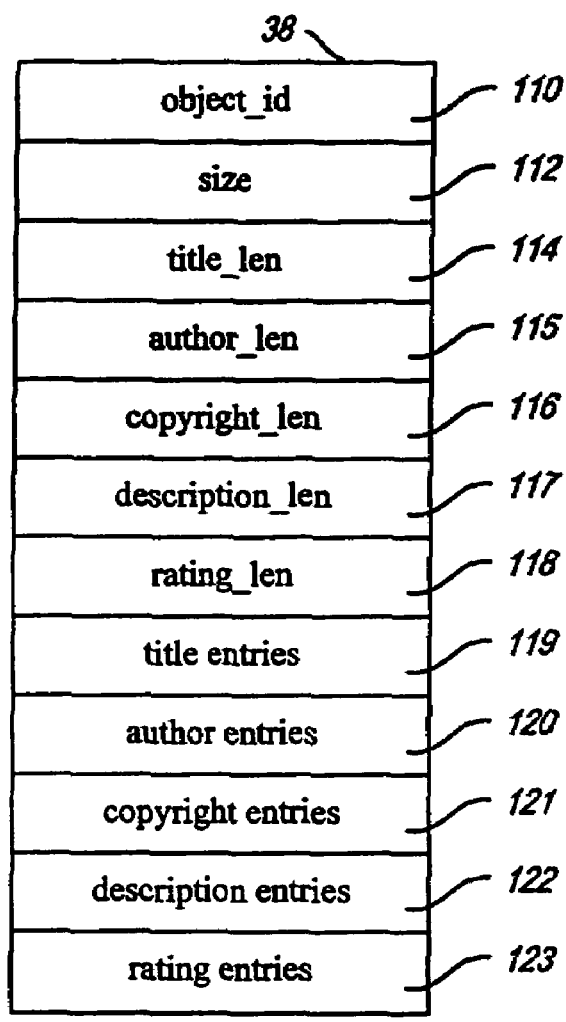
FIG. 9 is a diagram that illustrates the format of the content_description_object.

The stream_properties_object 36 holds at least three fields 92, 98 and 104 for holding information relating to error concealment strategies. In general, ASF facilitates the use of error concealment strategies that seek to reduce the effect of losing information regarding a given sample of media data. An example of an error concealment strategy is depicted in FIG. 8. A sample 106 is divided into four sections S.sub.1, S.sub.2, S.sub.3 and S.sub.4. When the sample is incorporated into packets in the ASF stream, the samples are distributed into separate packets P.sub.1, P.sub.2, P.sub.3 and P.sub.4 so that if any of the packets are lost, the amount of data that is lost relative to the sample is not as great, and techniques, such as interpolation, may be applied to conceal the error. Each sample has a number of associated properties that describe how big the sample is, how the sample should be presented to a viewer, and what the sample holds. Since the loss of the property information could prevent the reconstruction of the sample, the properties information for the entire sample is incorporated with the portions of the sample in the packets.

The error_concealment_strategy field 92 holds a UUID that identifies the error concealment strategy that is employed by the associated stream. The error_concealment_len field 98 describes the number of bytes in an error concealment data block that is held in the error_concealment_data entries 104. The properties associated with the error concealment strategy are placed in the error_concealment_data entries 104. The number of entries will vary depending upon the error concealment strategy that is adopted.

The stream_properties_object 36 includes a stream_number field 100 that holds an alias to a stream instance. The stream_properties_object 36 also includes an offset field 94 that holds an offset value to the stream in milliseconds. This value is added to all of the timestamps of the samples in the associated stream to account for the offset of the stream with respect to the timeline of the program that renders the stream. Lastly, the stream_properties_object 36 holds a type_specific_len field 96 that holds a value that describes the number of bytes in the type_specific_data entries 102. The type_specific_data entries 102 hold properties values that are associated with the stream type.

The header section 28 (FIG. 3) may also include a number of optional objects 38, 40, 42, 44, 45 and 46. These optional objects include a content_description_object 38 that holds information such as the title, author, copyright information, and ratings information regarding the ASF stream. This information may be useful and necessary in instances wherein the ASF stream 16 is a movie or other artistic work. The content_description_object 38 includes an object_id field 110 and a size field 112 like the other objects in the header section 28. A title_len field 114 specifies the size in bytes of the title entries 119 that hold character data for the title of the ASF stream 16. An author_len field 115 specifies the size in bytes of the author entries 120 which hold the characters that specify the author of the ASF stream 16. The copyright_len field 116 holds the value that specifies the length in bytes of the copyright entries 121 that hold copyright information regarding the ASF stream 16. The description_len field 117 holds a value that specifies the length in bytes of the description entries 122. The description entries 122 hold a narrative description of the ASF stream 16. Lastly, the rating_len field 118 specifies a size in bytes of the rating entries 123 that hold rating information (e.g., X, R, PG-13) for the ASF stream content.

The header section 28 may include a marker_object 40. The marker_object 40 holds a pointer to a specific time within the data section 30. The marker_object enables a user to quickly jump forward or backward to specific data points (e.g., audio tracks) that are designated by markers held within the marker_object 40.

Figure 10A:
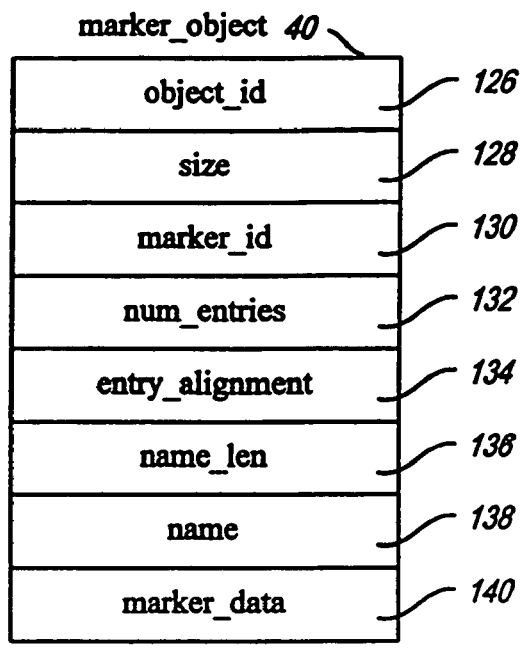
FIG. 10A is a diagram illustrating the format of the marker_object.

FIG. 10A shows the marker_object 40 in more detail. The marker_object 40 includes an object_id field 126 that holds a UUID, and a size field 128 specifies the size of the marker_object in bytes. A marker_id field 130 contains a UUID that identifies the marker data strategy, and a num_entries field 132 specifies the number of marker entries in the marker_object 40. An entry_alignment field 134 identifies the byte alignment of the marker data, and a name_len field 136 specifies how many Unicode characters are held in the name field 138, which holds the name of the marker_object 40. Lastly, the marker_data field 140 holds the markers in a table. Each marker has an associated entry in the table.

Figure 10B:
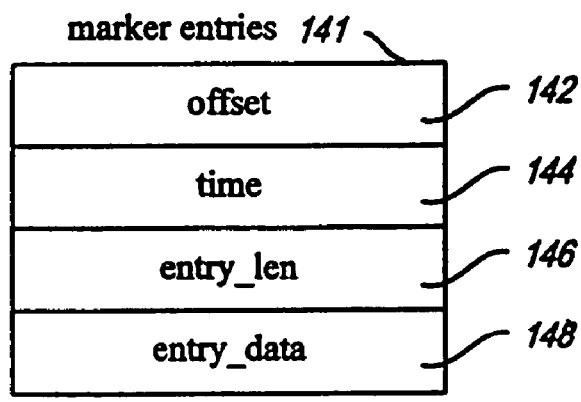
FIG. 10B is a diagram illustrating the format of a marker entry.

FIG. 10B shows the format of a marker entry 141 such as found in the marker_data field 140. An offset field 142 holds an offset in bytes from the start of packets in the data_object 47 indicating the position of the marker entry 141. A time field 144 specifies a time stamp for the marker entry 141. An entry_len field 146 specifies the size of an entry_data field 148, which is an array holding the data for the marker entry.

Figure 11:
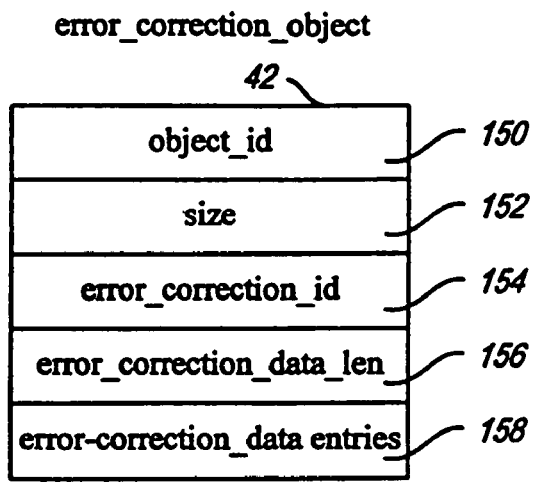
FIG. 11 is a diagram illustrating the format of the error_correction_object.

The header section 28 may also include an error_correction_object 42 for an error correction method that is employed in the ASF stream. Up to four error correction methods may be defined for the ASF stream 16 and, thus, up to four error_correction_objects 42 may be stored within the header section 28 of the ASF stream 16. FIG. 11 depicts the format of the error_correction_object 42.

The error_correction_object 42 includes an object_id field 150 and a size field 152, like those described above for the other objects in the header section 28. The error_correction_object 42 also includes an error_correction_id 154 that holds UUID that identifies the error correcting methodology associated with the object 42. The error_correction_data_len field 156 specifies the length in bytes of the error_correction_data entries 158 that hold octets for error correction. The error- _correction_object 42 is used by the destination computer 12 (FIG. 1) in playing the ASF stream 16.

Figure 12:
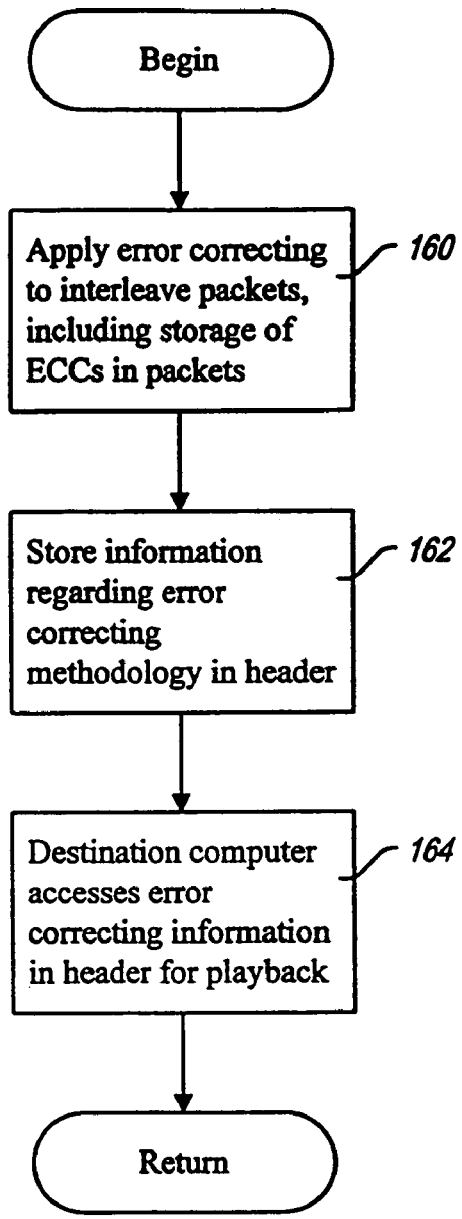
FIG. 12 is flowchart illustrating the steps that are performed to utilize error correcting information in accordance with a preferred embodiment of the present invention.

FIG. 12 depicts a flowchart of how error correcting may be applied in the preferred embodiment of the present invention. In particular, an error correction methodology such as an N+1 parity scheme, is applied to one or more streams within the ASF stream 16 (step 160 in FIG. 12). Information regarding the error correcting methodology is then stored in the error_correction_object 42 within the header section 28 (step 162 in FIG. 12). The source computer then accesses the error correcting methodology information stored in the error_correction_object 42 in playing back the ASF stream 16 (step 164 in FIG. 12). Error correcting data is stored in the interleave_packets 48.

Figure 13:
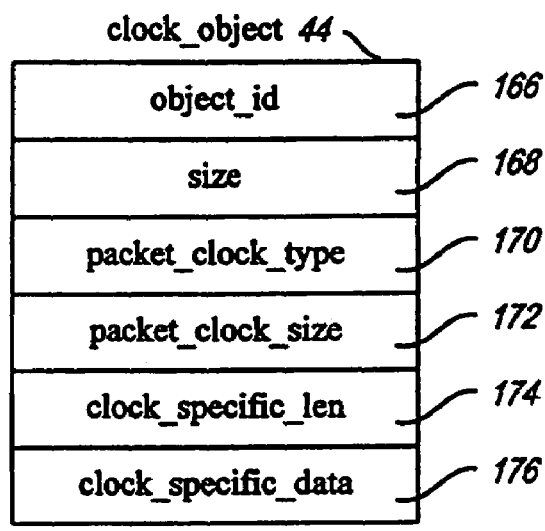
FIG. 13 is a diagram illustrating format of the clock_object.

The header section 28 of the ASF stream 16 may also hold a clock_object 44 that defines properties for the timeline for which events are synchronized and against which multimedia objects are presented. FIG. 13 depicts the format of the clock_object 44. An object_ID field 166 holds a UUID to identify the object, and a size field 168 identifies the size of the clock_object 44 in bytes. A packet_clock_type field 170 identifies the UUID of the clock_type that is used by the object. A packet_clock_size field 172 identifies the clock size. A clock_specific_len field 174 identifies the size and bytes of the clock_specific_data field 176 which contains clock-specific data. The clock type alternatives include a clock that has a 32-bit source value and a 16-bit duration value, a clock type that has a 64-bit source value and a 32-bit duration value and a clock type that has a 64-bit source value and a 64-bit duration value.

Figure 14A:
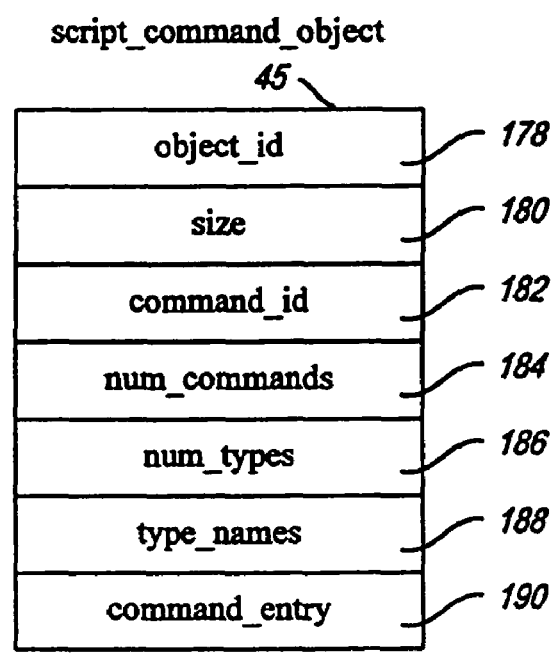
FIG. 14A is a diagram illustrating the format of the script_command_object.

The ASF stream 16 enables script commands to be embedded as a table in the script_command_object 45. This object 45 may be found in the header section 28 of the ASF stream 16. The script commands ride the ASF stream 16 to the client where they are grabbed by event handlers and executed. FIG. 14A illustrates the format of the script_command_object 45. Like many of the other objects in the header section 28, this object 45 may include an object_ID field 178 for holding a UUID for the object and a size field 180 for holding the size in bytes of the object. A command_ID field 182 identifies the structure of the command entry that is held within the object.

Figure 14B:
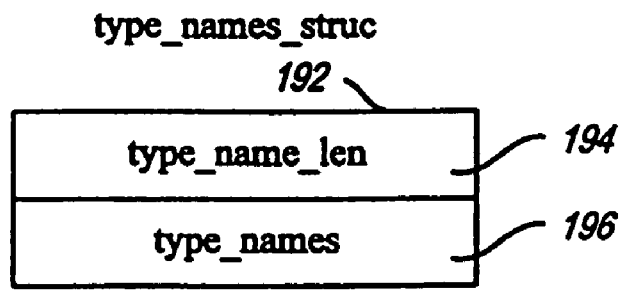
FIG. 14B is a diagram illustrating the format of a type_names_struc.

The num_commands field 184 specifies the total number of script commands that are to be executed. The num_types field 186 specifies the total number of different types of script_command types that have been specified. The type_names field 188 is an array of type_names_struc data structures. FIG. 14B depicts the format of this data structure 192. The type_name_len field 194 specifies the number of Unicode characters in the type_names field 196, which is a Unicode string array holding names that specify script command types.

Figure 14C:
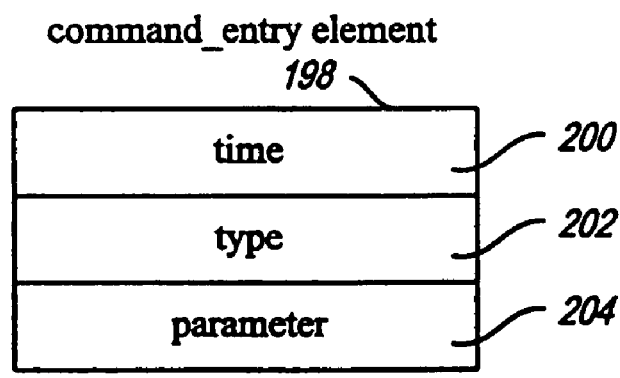
FIG. 14C is a diagram illustrating the format of a command_entry.

The command_entry field 190 identifies what commands should be executed at which point in the timeline. The command_entry field 190 is implemented as a table of script commands. Each command has an associated command_entry element 198 as shown in FIG. 14C. Each such element 198 has a time field 200 that specifies when the script command is to be executed and a type field 202 that is an index into the type_names array 196 that identifies the start of a Unicode string for the command type. A parameter field 204 holds a parameter value for the script command type.

The script commands may be of a URL type that causes a client browser to be executed to display an indicated URL. The script command may also be of a file name type that launches another ASF file to facilitate "continuous play" audio or video presentations. Those skilled in the art will appreciate that other types of script commands may also be used.

Figure 15A:
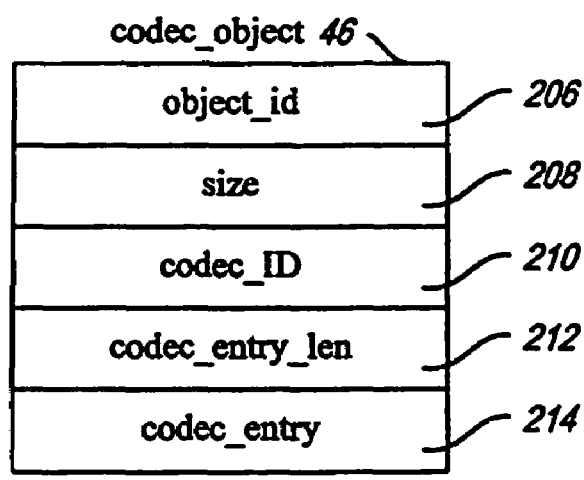
FIG. 15A is a diagram illustrating the format of the codec_object.

The header section 28 of the ASF stream 16 may also include a codec_object 46. The codec_object 46 provides a mechanism to embed information about a codec dependency that is needed to render the data stream by that codec. The codec object includes a list of codec types (e.g., ACM or ICM) and a descriptive name which enables the construction of a codec property page on the client. FIG. 15A depicts the format of a codec_object 46. The object_id field 206 holds a UUID for the codec_object 46 and the size field 208 specifies the size of the object 46 in bytes. The codec_ID field 210 holds a UUID that specifies the codec_type used by the object. The codec_entry_len field 212 specifies the number of CodecEntry entries that are in the codec_entry field 214. The codec_entry field 214 contains codec-specific data and is an array of CodecEntry elements.

Figure 15B:
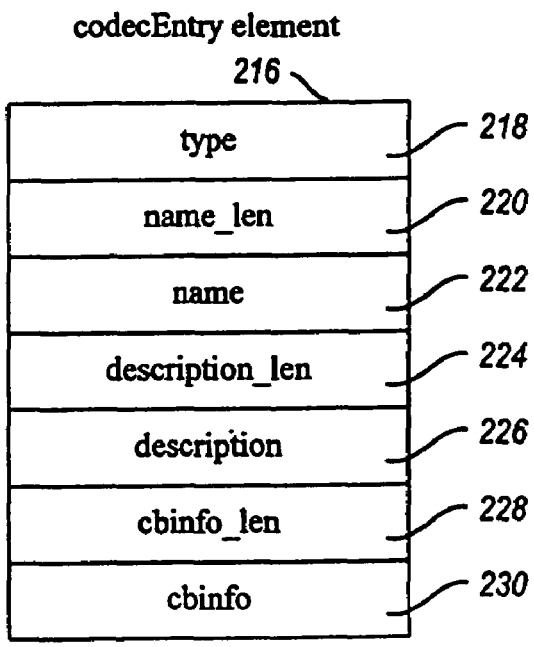
FIG. 15B is a diagram of a CodecEntry.

FIG. 15B depicts the format of a single CodecEntry element 216 as found in the codec_entry field 214. A type field 218 specifies the type of codec. A name field 222 holds an array of Unicode characters that specifies the name of the codec and a name_len field 220 specifies the number of Unicode characters in the name field. The description field 226 holds a description of the codec in Unicode characters and the description_len field 224 specifies the number of Unicode characters held within the description field. The cbinfo field 230 holds an array of octets that identify the type of the codec and the cbinfo_len field 228 holds the number of bytes in the cbinfo field 230.

As mentioned above, the data section 30 follows the header section 28 in the ASF stream 16. The data section includes a data_object 47 and interleave_packets 48. A data_object 47 marks the beginning of the data section 30 and correlates the header section 28 with the data section 30. The packets 48 hold the data payloads for the media stream stored within the ASF stream 16.

Figure 16:
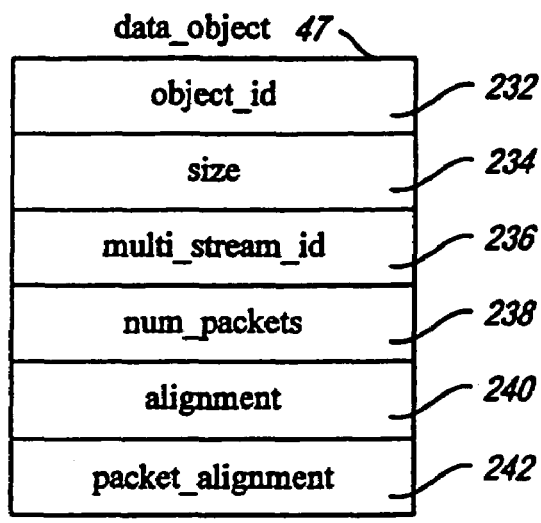
FIG. 16 is a diagram illustrating the format of the data_object.

FIG. 16 depicts the format of the data_object 46. Like other objects in the ASF stream 16, data_object 46 includes an object_id field 232 and a size field 234. The data_object 46 also includes a multimedia_stream_id field 236 that holds a UUID for the ASF stream 16. This value must match the value held in the multimedia_stream_id field 60 in the properties_object 34 in the header section 28. The data_object 46 also includes a num_packets field 238 that specifies the number of interleave_Packets 48 in the data section 30. An alignment field 240 specifies the packing alignment within packets (e.g., byte alignment or word alignment), and the packet-alignment field 242 specifies the packet packing alignment.

Figure 17:
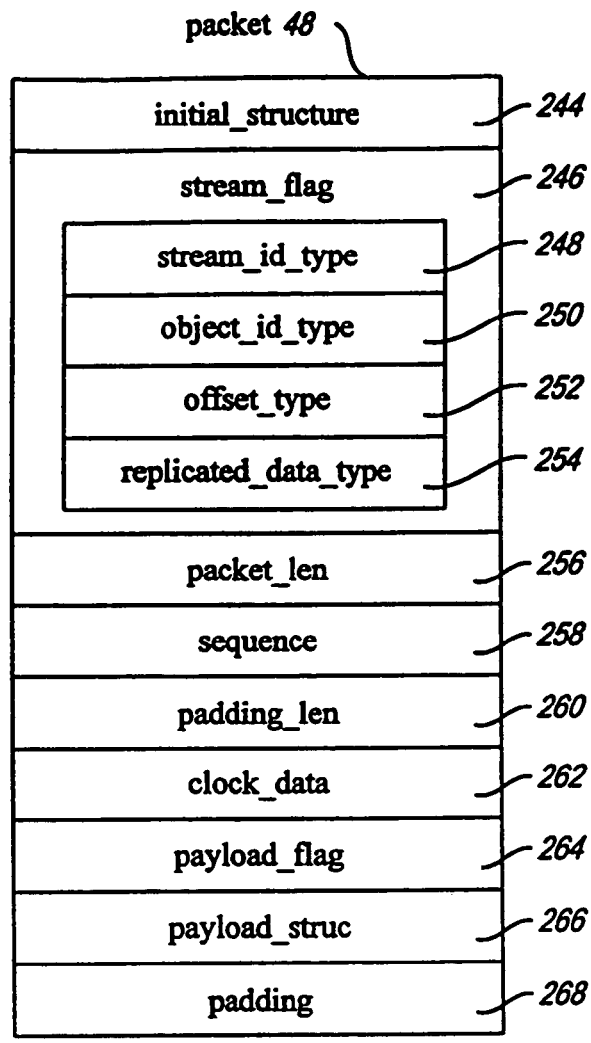
FIG. 17 illustrates the format of a packet.
Figure 18A:
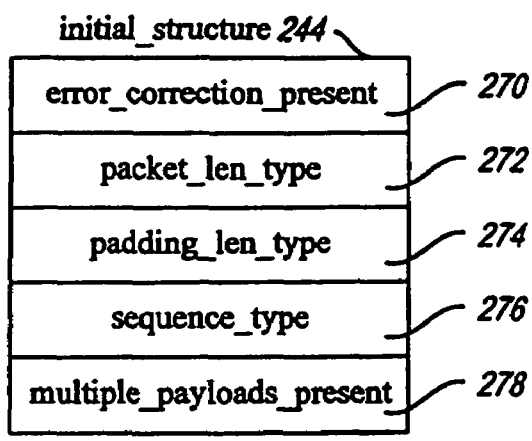
FIG. 18A illustrates a first format that the initial_structure may assume.

Each packet 48 has a format like that depicted in FIG. 17. Each packet 48 begins with an initial_structure 244. The format of the initial_structures 244 depends upon whether the first bit held within the structure is set or not. FIG. 18A depicts a first format of the initial_structure 244 when the most significant bit is cleared (i.e., has a value of zero). The most significant bit is the error_correction_present flag 270 that specifies whether error correction information is present within the initial_structure 244 or not. In this case, because the bit 270 is cleared, there is no error correction information contained within the initial_structure 244. This bit indicates whether or not error correction is used within the packet. The two bits that constitute the packet_len_type field 272 specify the size of the packet_len field 256, which will be described in more detail below. The next two bits constitute the padding_len_type field 274 and specify the length of the padding_len field 260, which will also be discussed in more detail below. The next two bits constitute the sequence_type field 276 and specify the size of the sequence field 258. The final bit is the multiple_payloads_present flag 278 which specifies whether or not multiple payloads are present within the packet. A value of 1 indicates that multiple media stream samples (i.e., multiple payloads) are present within the packet.

Figure 18B:
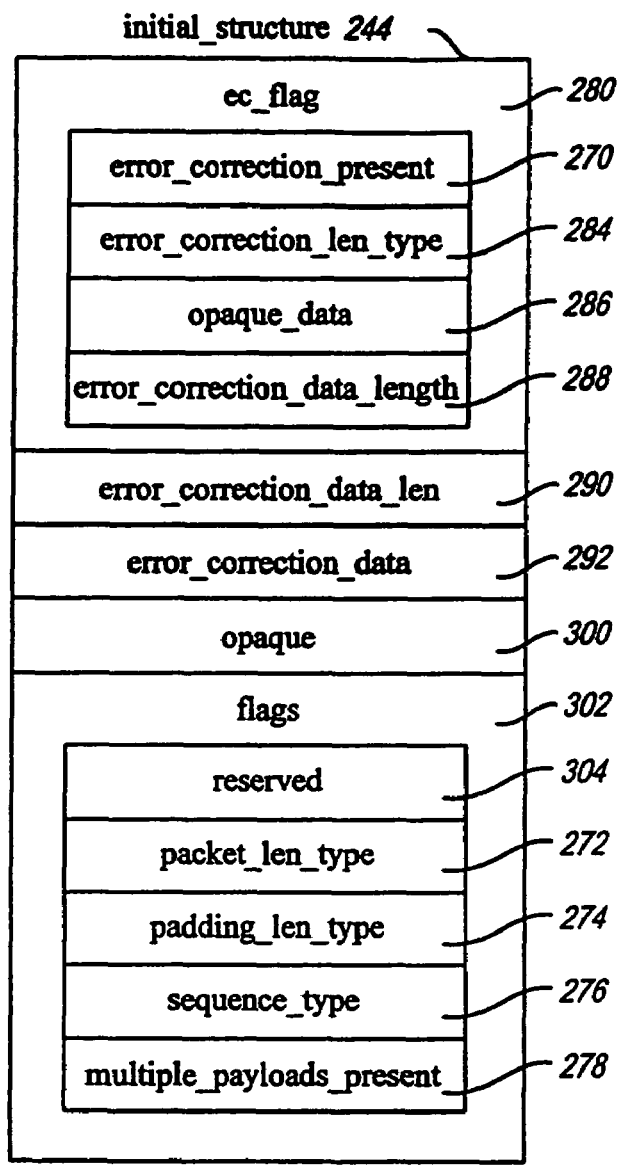
FIG. 18B illustrates a second format that the initial_structure may assume.

FIG. 18B depicts the format of the initial_structure 244 when the error_correction_present bit is set (i.e., has a value of 1). In this instance, the first byte of the initial_structure 244 constitutes the ec_flag field 280. The first bit within the ec_flag field is the error_correction_present bit 270, which has been described above. The two bits that follow the error_correction_present bit 270 constitute the error_correction_len_type field 284 and specify the size of the error_correction_data_len field 290. The next bit constitutes the opaque_data flag 286 which specifies whether opaque data exists or not. The final four bits constitute the error_correction_data length field 288. If the error_correction_len_type field 284 has a value of "00" then the error_correction_data_length field 288 holds the error_correction_data_len value and the error_correction_data_len field 290 does not exist. Otherwise this field 288 has a value of "0000." When the error_correction_data_len field 290 is present, it specifies the number of bytes in the error_correction_data array 292. The error_correction_data array 292 holds an array of bytes that contain the actual per-packet data required to implement the selected error correction method.

The initial_structure 244 may also include opaque data 300 if the opaque_data bit 286 is set. The initial structure includes a byte of flags 302. The most significant bit is a reserved bit 304 that is set to a value of "0." The next two bits constitute the packet_len_type field 306 that indicate the size of the packet_len field 256. The next subsequent two bits constitute the padding_len_type field 272 that indicate the size of the padding_len field 274. These two bits are followed by another 2-bit field that constitutes the sequence_type of field 276 that specifies the size of the sequence field 258. The last bit is the multiple_payloads_present bit 278 that specifies whether are not multiple payloads are present.

The initial_structure 244 is followed by a stream_flag field 246 that holds a byte consisting of four 2-bit fields. The first two bits constitute a stream_id_type field 248 that specifies the size of the stream_id field 314 within the payload_struc 266. The second most significant bits constitute the object_id_type field 250 and indicate the number of bits in the object_id field 316 of the payload_struc 266 as either 0-bits, 8-bits, 16-bits or 32-bits. The third most significant two bits constitute the offset_type field 252, which specifies the length of the offset field 318 within the payload_struc 266 as either 0-bits, 8-bits, 16-bits or 32-bits. The least two significant bits constitute the replicated_data_type field 254 and these bits indicate the number of bits that are present for the replicated_data_len field 320 of the payload_struc 266.

The packet 48 also includes a packet_len field 256 that specifies the packet length size. The sequence field 258 specifies the sequence number for the packet. The padding_len field 260 contains a number that specifies the number of padding bytes that are present at the end of the packet to pad out the packet to a desirable size.

The packet 48 also contains a clock_data field 262 that contains data representing time information. This data may include a clock license that contains a system clock reference that drives the progression of the time line under the timing model and a duration that specifies the effective duration of the clock license. The duration field limits the validity of the license to a time specified in milliseconds. Under the model adopted by the preferred embodiment of the present invention, the source computer 10 issues a clock license to the destination computer 12 that allows the clock of the destination computer 12 to progress forward for a period of time. The progression of time is gated by the arrival of a new piece of data that contains a clock value with a valid clock license that is not expired.

The packet 48 also includes a payload-flag field 264 that specifies a payload length type and a designation of the number of payloads present in the packet. The payload-flag field 264 is followed by one or more payload_strucs 266. These structures contain payload information which will be described in more detail below. The final bits within the packet 48 may constitute padding 268.

Figure 19:
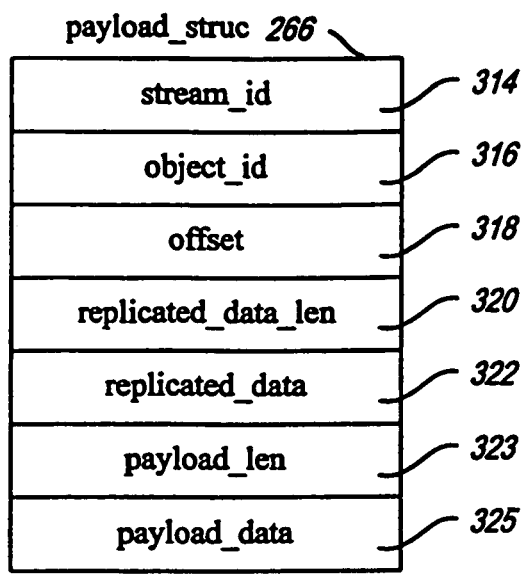
FIG. 19 illustrates the format of a payload_struc.

FIG. 19 depicts the payload_struc 266 in more detail. The stream_id field 314 is an optional field that identifies the stream type of the payload. The object_id field 316 may be included to hold an object identifier. An offset field 318 may be included to specify an offset of the payload within the ASF stream. The offset represents the starting address within a zero-address-based media stream sample where the packet payload should be copied.

The payload_struc 266 may also include a replicated_data_len field 320 that specifies the number of bytes of replicated data present in the replicated_data field 322. As was discussed above, for protection against possible errors, the packet 48 may include replicated data. This replicated data is stored within the replicated_data field 322.

The payload_len field 323 specifies the number of payload bytes present in the payload held within the payload_data field 325. The payload_data field 326 holds an array of payloads (i.e., the data).

Figure 20:
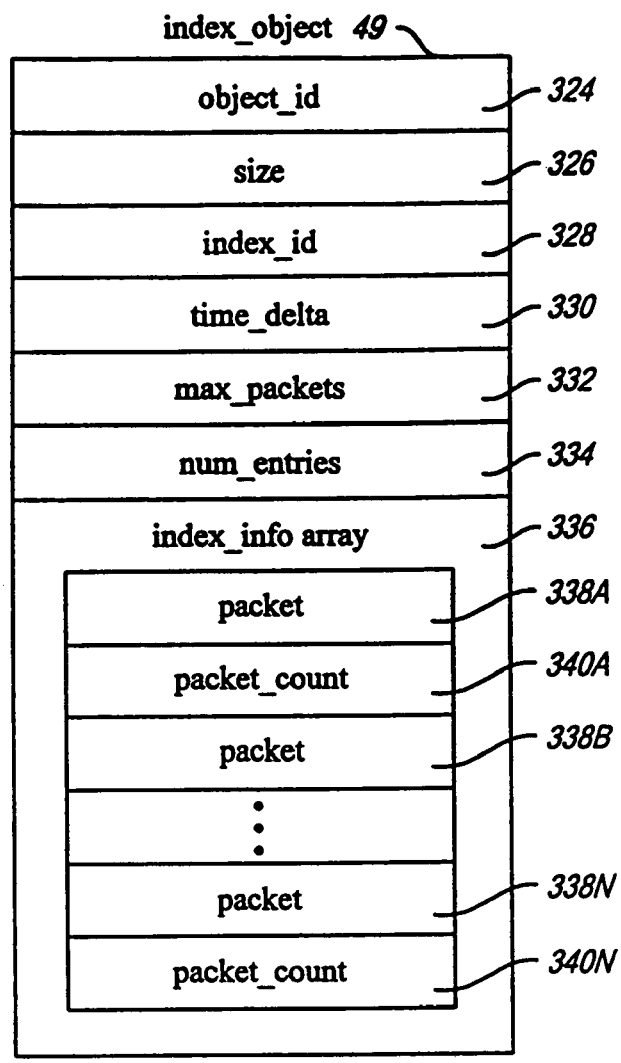
FIG. 20 is a diagram illustrating the format of the index_object.

The ASF stream may also include an index_object 49 that holds index information regarding the ASF stream 16. FIG. 20 depicts the format of the index_object 49. The index_object includes a number of index entries. The index_object 49 includes an object_id field 324 and a size field 326. In addition, the index_object 49 includes an index_id field 328 that holds a UUID for the index type. Multiple index_name_entries may be stored depending on the number of entries required to hold the characters of the name. For example, each entry may hold 16 characters in an illustrative embodiment.

The index_object includes a time_delta field 330 that specifies a time interval between index entries. The time represents a point on the timeline for the ASF stream 16. A max_packets field 332 specifies a maximum value for packet_count fields, which will be described in more detail below. A num_entries field 334 is a 32-bit unsigned integer that describes the maximum number of index entries that are defined within the index_info array 336. This array 336 is an array of index_information structures. Each index_info structure holds a packet field that holds a packet number associated with the index entry and a packet_count field specifies the number of the packet to send with the index entry so as to associate the index entries with the packets. In FIG. 21, the index_info array structure 336 holds N index_information structures and each index-information structure has a packet field 338A-338N and a packet_count field 340A-340N.

While the present invention has been described with reference to a preferred embodiment thereof, those skilled in the art will appreciate that various changes in form and detail may be made without departing from the intended scope of the invention as defined in the appended claims. For example, the present invention may be practiced with a stream format that differs from the format described above. The particulars described above are intended merely to be illustrative. The present invention may be practiced with stream formats that include only a subset of the above-described fields or include additional fields that differ from those described above. Moreover, the length of the values held within the fields and the organization of the structures described above are not intended to limit the scope of the present invention.

What is claimed is:

1. A computer comprising:
a processor;
storage; and
a logical structure stored in the storage encapsulating multiple data streams, data from said data streams being incorporated in packets, wherein:
the data incorporated in the packets are of a new media type;
the logical structure includes an identifier for the new media type; and
the identifier being used to determine a renderer to use to render data of the new media type; and
a clock license being encapsulated into at least one packet for advancing a clock at a destination when processed at the destination
the computer, utilizing the processor and storage functionality, transmit, the packets of the logical structure on a packet-by-packet basis over a network from the computer to a destination computer.

2. The computer of claim 1, wherein the logical structure holds a field for a maximum packet size and a field for a minimum packet size.

3. The computer of claim 1, wherein the multiple streams of data in the logical structure are Active Stream Format (ASF) data streams.

4. The computer of claim 1, wherein the logical structure holds a value that specifies a maximum bit rate at which the multiple streams of data may be rendered.

5. A system comprising:
a processor;
storage functionally coupled to the processor, wherein a logical structure is stored in the memory, the logic structure encapsulating multiple streams of data, said streams of data being stored in packets, by:
storing samples of data from multiple data streams in the packets;
storing replicas of information in at least some of the packets;
storing error correcting data in the at least some of the packets, wherein the error correcting data identifies an error correcting method for the at least some of the packets; setting a flag in the packets that hold the replicas;
storing in the logical structure a field for a maximum packet size and a field for a minimum packet size; and
encapsulating the packets into the logical structure, wherein at least some of the packets hold the replicas;
storing clock licenses that dictate advancement of a clock in multiple ones of the packets;
the system, utilizing the processor and storage functionality, transmit, the packets of the logical structure on a packet-by-packet basis over a network from the source computer to the destination computer; and
for each packet that holds a clock license, advancing the clock at the destination computer as dictated by the clock license in response to receiving the packet at the destination computer.

6. The system as defined in claim 5, wherein the replicas of information hold property information regarding the samples of data.

7. The system of claim 5 wherein portions of a sample are stored in selected packets and a replica of property information regarding the sample is stored in each packet in which a portion of the sample is stored.

8. The system of claim 5, further comprising the step of examining one of the replicas of information at the destination computer when one of the packets is lost during the transmitting.

9. The system of claim 5, further comprising using the error correcting data in the at least some of the packets to correct an error when the transmitted logical structure is received at the destination.

10. The system as defined in claim 5, wherein the multiple streams of data in the logical structure are Active Stream Format (ASF) data streams.

11. The system of claim 5, wherein:
the logical structure includes a header section and a data section; and
the error correcting data is stored in multiple packets in the data section.

12. The system of claim 11, wherein information in the header section of the logical structure indicates what error correcting methodology is used with the error correcting data stored in the multiple packets in the data section.

13. The system of claim 11, wherein the header section holds information regarding multiple error correcting methods.

14. The system of claim 11, wherein the error correcting data identifies one of a plurality of error correcting methods.

15. The system of claim 11, wherein the error correcting data holds parity bits.

16. A computer comprising:
A processor;
storage; and
a logical structure stored in the storage encapsulating multiple data streams, data from said data streams being of a new media type and incorporated in packets, wherein the logical structure includes an identifier of the new media type from which a renderer can be determined to render the data of the new media type; and
a clock license being encapsulated into at least one packet for advancing a clock at a destination when processed at the destination, wherein:
the streams of data stored in the packets are samples of data from multiple data streams in the packets for transmission on a packet-by-packet basis over a network;
replicas of information are stored in at least some of the packets;
error correcting data is stored in the at least some of the packets;
the error correcting data identifies an error correcting method for the at least some of the packets; and
a flag is stored in each said packet that holds the replicas; and
the computer, utilizing the processor and storage functionality, transmit, the packets of the logical structure on a packet-by-packet basis over a network from the computer to a destination computer.

17. A computer comprising:
a processor;
storage;
a logical structure stored in the storage encapsulating multiple data streams, wherein:
the data from said data streams is incorporated in packets; and
the multiple streams of data in the logical structure are Active Stream Format (ASF) data streams;
a clock license being encapsulated into at least one packet for advancing a clock at a destination when processed at the destination, wherein portions of a sample are stored in selected packets and a replica of property information regarding the sample is stored in each packet in which a portion of the sample is stored; and the computer, utilizing the processor and storage functionality, transmit, the packets of the logical structure on a packet-by-packet basis over a network from the computer to a destination computer.

18. The computer of claim 17, wherein:

the logical structure includes a header section and a data section, and the error correcting data is stored in multiple packets in the data section.

19. The computer of claim 18, wherein information in the header section of the logical structure indicates what error correcting methodology is used with the error correcting data stored in the multiple packets in the data section.

20. The data processing system as defined in claim 18, wherein the header section holds information regarding multiple error correcting methods.

21. The computer of claim 18, wherein the error correcting data identifies a plurality of error correcting methods.

22. The computer of claim 18, wherein the error correcting data holds parity bits.

23. The computer of claim 18, wherein the logical structure includes a field for a maximum packet size and a field for a minimum packet size.

24. The computer of claim 18, wherein the multiple streams of data in the logical structure are Active Stream Format (ASF) data streams.

25. The computer of claim 18, wherein the logical structure includes a field for holding a value that specifies a maximum bit rate at which the multiple streams of data may be rendered.

26. The data processing system as defined in claim 18, wherein the logical structure includes a field for an identifier of a new media type for the data from said data streams incorporated in the packets and from which a renderer can be determined to render the data of the new media type.

* * * * *